US007343409B1

(12) United States Patent
Kremer et al.

(10) Patent No.: US 7,343,409 B1
(45) Date of Patent: Mar. 11, 2008

(54) METHOD, SYSTEM AND ARTICLE OF MANUFACTURE FOR DISCOVERING DEVICES IN A NETWORK MONITORING SYSTEM

(75) Inventors: James R. Kremer, Longmont, CO (US); Pascal Ledru, Boulder, CO (US); Xuefeng Yao, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 954 days.

(21) Appl. No.: 10/685,243

(22) Filed: Oct. 14, 2003

(51) Int. Cl.
*G06F 13/00* (2006.01)
(52) U.S. Cl. .................. 709/224; 709/220; 709/238
(58) Field of Classification Search ............... 709/220, 709/221, 223, 224, 230; 719/313, 331
See application file for complete search history.

(56) References Cited

U.S. PATENT DOCUMENTS

| 5,999,940 | A  | * | 12/1999 | Ranger .................. 707/103 R |
| 6,311,321 | B1 | * | 10/2001 | Agnihotri et al. ........... 717/120 |
| 7,024,476 | B1 | * | 4/2006  | Page et al. .................. 709/224 |
| 7,035,270 | B2 | * | 4/2006  | Moore et al. ............... 370/401 |
| 7,085,814 | B1 | * | 8/2006  | Gandhi et al. ............. 709/208 |
| 2004/0111525 | A1 | * | 6/2004  | Berkland et al. ........... 709/231 |

OTHER PUBLICATIONS

Deignan, Michael P., "NTManage 2.0", Windows & .NET Magazine Network, May 1999, <http://www.winnetmag.com/Articles/Print.cfm?ArticleID=5204>.
Edwards, Mark Joseph, "Managing TCP/IP Networks with NTManage", Windows & .NET Magazine Network, Dec. 1996, <http://www.winnetmag.com/Articles/Print.cfm?ArticleID=2857>.

"High-Quality Media Distribution in the Digital Home, The UPnP Technology", Interoperable Home Infrastructure, Intel Technology Journal, vol. 6, Issue 4, Nov. 15, 2002, <http://www.intel.com/technology/itj/2002/volume06issue04/art02_distribution/p03_upnp_...>.
"MonitoringMagic 5—Features—Monitoring", Tools4ever—Products, <http://www.tools4ever.com/products/monitormagic/features/monitoring.asp>, printed Jul. 22, 2003.
"Ipswitch's WhatsUp Gold 3.5 Chosen to Monitor the InteropNet Network for Third Year", Ipswitch, May 5, 1998, Las Vegas, NV, <http://www.ipswitch.com/company/Press_Releases/980505_interopnet.html>.
Green, John, "HP OpenView Network Node Manager 5.02 for Windows NT", Windows & .NET Magazine, Nov. 1998, <http://www.winntmag.com/Articles/Index.cfm?ArticleID=3966>.
"New Intel NetportExpress 10/100 features", Intel Networking Technical Q&A, <http://www.intel.com/network/connectivity/products/questions_answers/print_servers1.htm>, printed Jul. 22, 2003.

* cited by examiner

*Primary Examiner*—Viet D. Vu
(74) *Attorney, Agent, or Firm*—Dorsey & Whitney LLP (57) ABSTRACT

In a network monitoring system, a plug-in module specifies how devices of that type should be discovered, including the directories or registries that should be examined for device references, how these directories should be examined, how the network should be probed for devices and how detected devices should be identified. Each plug-in module has one of a plurality of predetermined standard interfaces that allow the discovery modules to operate with a single discovery framework. During a discovery operation for a particular device type, the discovery framework dynamically creates the discovery plug-in modules necessary to discover devices of that type and controls these modules via the standard interfaces to perform device type specific discovery.

21 Claims, 8 Drawing Sheets

METHOD, SYSTEM AND ARTICLE OF MANUFACTURE FOR DISCOVERING DEVICES IN A NETWORK MONITORING SYSTEM

FIELD OF THE INVENTION

This invention relates to network monitoring systems for monitoring and managing a data processing network and for automatically discovering and locating devices attached to the network from a central location.

BACKGROUND OF THE INVENTION

Figure 1:
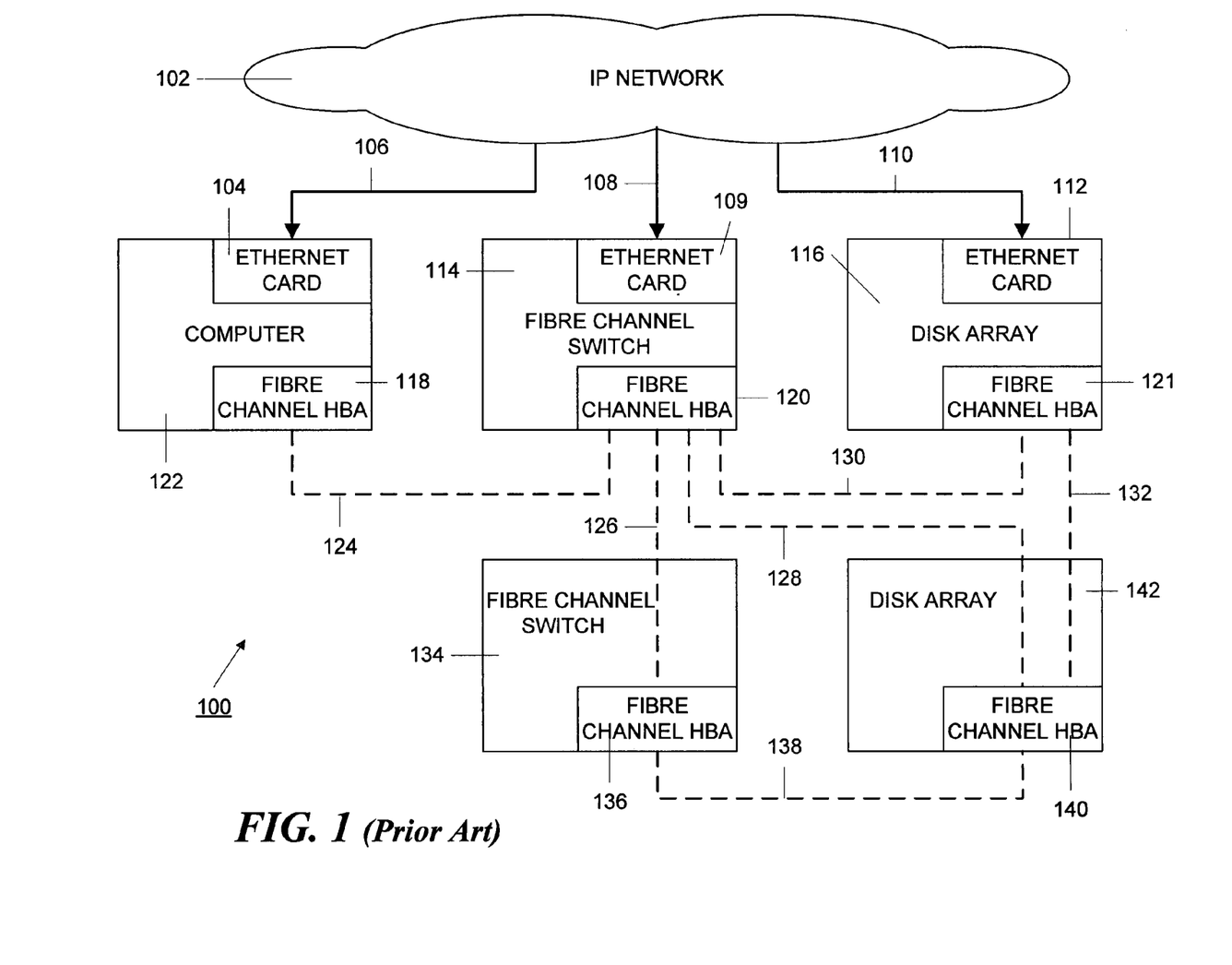
FIG. 1 is a schematic block diagram of an illustrative network showing a variety of network devices connected to the network.

Large and complex data processing networks are now commonplace. A typical such network may have hundreds or thousands of devices that are connected together. These devices can be workstation computers, server computers, switches, storage arrays, tape libraries, printers, routers and other such devices. The devices may be connected together by LANs that are, in turn, connected together by a wide area network, such as the Internet. An illustrative network configuration 100 is shown in FIG. 1. In this configuration, devices may be connected together by networks having several different protocols. For example, the computer 122, the Fibre Channel switch 114 and the disk array 116 each contain Ethernet cards 104, 109 and 112, respectively. These cards allow the devices to connect together and exchange information via an IP network 102, which could be the Internet, as schematically indicated by connections 106, 108 and 110. To facilitate identifying the devices, each device is typically assigned an IP network address.

In addition, the computer 122 can also by connected to the disk array 116 via another network with a different protocol, such as Fibre Channel. For example, computer 122 also has a Fibre Channel host bus adapter (HBA) 118 that allows it to connect to the Fibre Channel switch 114 via the Fibre Channel HBA 120 as shown schematically by connection 124. The switch 114, in turn, can connect the computer 122 to the disk array 116 via Fibre Channel HBA 121 as shown schematically by connection 130.

Fibre Channel switch 114 can also connect to other devices, such as a second Fibre Channel switch 134 or another disk array 142. For example, Fibre Channel switch 114 can connect, via Fibre Channel HBA 120, to Fibre Channel switch 134, via Fibre Channel HBA 136, as shown schematically by connection 126. Similarly, Fibre Channel switch 114 can connect, via Fibre Channel HBA 120, to disk array 142, via Fibre Channel HBA 140, as shown schematically by connection 128. Finally Fibre Channel switch 134 can also connect, via Fibre Channel 136 to disk array 142, via Fibre Channel HBA 140 as shown schematically by connection 138.

The diversity of devices and possible connections leads to extraordinarily complex network configuration that may have hundreds or thousands of devices connected together in very complex patterns. In most large network configurations, it is important to monitor the network devices, such as computers, switches, storage arrays, tape libraries, etc., and to ensure that problems related to these devices are detected and resolved promptly. In a large network, monitoring is performed by a monitoring application program operating in a central location under supervision of system administration staff.

Currently, it is difficult to compile a list of devices that must be monitored by such a monitoring application. For example, a system administrator could manually identify the network IP addresses of the devices that must be monitored and then update a property file with these addresses. The monitoring application can then read the property file to locate the devices. In a large network, a network monitoring application typically will monitor hundreds or thousands of devices. Thus, it is impractical for a system administrator to individually identify all of the devices that will be monitored. In addition, when some network addresses are modified, the system administrator must somehow recognize that the system has changed and reconfigure the monitoring application.

Consequently, an important aspect of such a monitoring application is the ability to quickly and automatically discover all devices that can be monitored. It is also important to provide the capability for a system administrator to select the type of devices to be monitored. For example, the administrator may decide to monitor only disk arrays manufactured by a specified vendor. This capability is important because the monitoring application may not provide support for all device types and, therefore, there is no need to monitor all device types.

Devices connected to a network typically can be discovered by a monitoring program by means of two different mechanisms. The first mechanism is to use a directory service, registry or lookup service. This mechanism works with devices that are registered in the lookup service, registry or directory service. Thus, system administration must insure that all devices are registered in a lookup service such as the Service Location Protocol (described in detail at http://www.ietf.org/rfc/rfc2165.txt) lookup service, the Jini lookup service described in the Jini specification located at http://www.jini.org/standards, or the Common Information Model Object Manager. After all devices have been registered, the monitoring application can look for references to the monitored devices in the registries. Unfortunately, lookup services are not often used to map device references to the device network addresses, except for the Domain Name System (DNS) (RFC 1034-1035) which is used to map the name of a network host to a network address. Thus, although many devices will be registered, the lookup service cannot be used to find the actual network address in most cases.

The second discovery mechanism uses a probe to sense whether a device exits at a given network address. In this mechanism, the system administrator provides a range of network addresses to the monitoring application. The monitoring application then sends a software probe to, or "pings", each address in the address range. If a device exists at that address, it will respond, generally with information identifying itself. Thus, the monitoring application will discover the device at that address. This latter mechanism works whether the devices are mapped to a network address with a lookup service or not.

However, a problem with the probe mechanism is that the probe must be able to retrieve device description information directly from a device when it finds the device at a given address. Since the monitoring application cannot know in advance what type of device will be connected to the network, the probe system is typically limited to working with devices that use a network management protocol, such as the Simple Network Management Protocol (SNMP, RFC 1157), which allows a device to return identifying information to a requesting entity. If a device is encountered that does not use the management protocol that allows it to return identifying information, then the probe cannot retrieve information from the device and therefore cannot identify the device.

SUMMARY OF THE INVENTION

In accordance with the principles of the invention, some one familiar with the device, such as the software developer that writes the driver for a particular device type, specifies how devices of that type should be discovered, including the directories or registries that should be examined for device references, how these directories should be examined, how the network should be probed for devices and how detected devices should be identified. In particular, for each device type, a plug-in module specifies how this device type should be discovered.

In one embodiment, each plug-in module has one of a plurality of predetermined standard interfaces. The standard interfaces allow the discovery modules to operate with a single discovery framework even though the modules are written for a specific device type.

In another embodiment, during a discovery operation for a particular device type, the discovery framework dynamically creates the discovery plug-in modules necessary to discover devices of that type and controls these modules via the standard interfaces to perform device type specific discovery. Thus, the discovery framework is able to discover new devices of the specified type without requiring manual reconfiguration.

BRIEF DESCRIPTION OF THE DRAWINGS

The above and further advantages of the invention may be better understood by referring to the following description in conjunction with the accompanying drawings in which.

DETAILED DESCRIPTION

Figure 2:
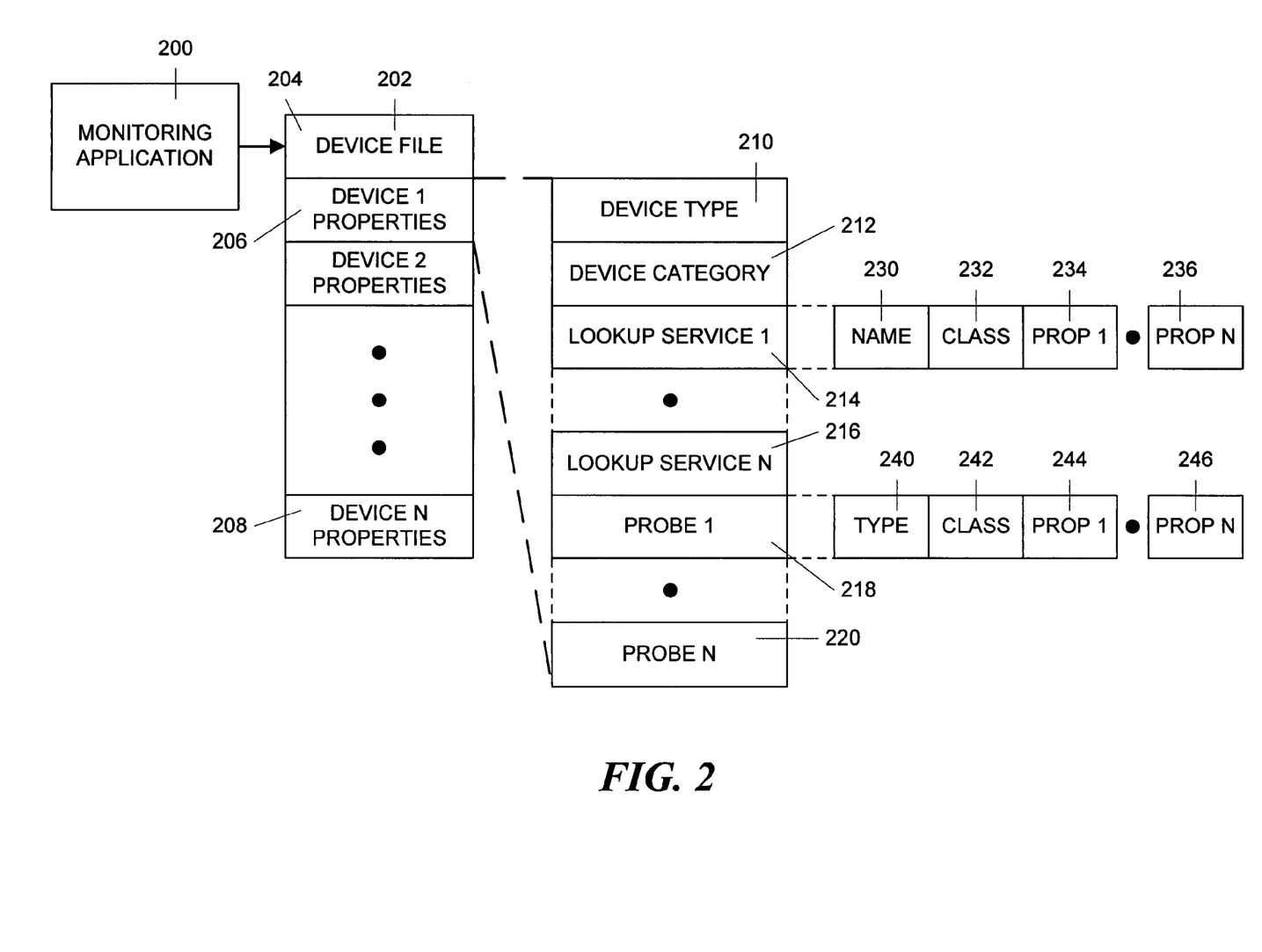
FIG. 2 is a block schematic diagram of the contents of a device information file that is created by software developers and is used by the inventive discovery framework to identify devices.

In accordance with the principles of the invention, the monitoring application comprises a device discovery framework that uses a "plug-in" module written for a specific device type to tailor the device discovery system to the device management protocol used by that type of device. In particular, during operation when searching for a particular device type, the inventive device discovery system examines a predetermined directory for a file specifying the behavior of that device type. Such a directory 202 is shown in FIG. 2. Directory 202 contains a plurality of files, of which files 204, 206 and 208 are shown. Although only three files are illustrated in FIG. 2, one skilled in the art would understand that more or less than three files might be present in directory 202 at any given time. Each of files 204, 206 and 208 contains information for a specific device type.

For example, the predetermined directory might be a directory such as: monitoringApplication/properties/device. This directory may illustratively contain the following files among others:
Switch_A.properties
Switch_B.properties
Storage_Array_A.properties
Storage_Array_B.properties Each of these files contains specific information for a device type as indicated by the file name. The contents of the file are typically created by a device developer or the programmer that wrote the code for the device driver software. In FIG. 2, the contents of file 204 have been shown in detail. These contents might include a record 210 holding the name of the device type, a record 212 holding the device type category and lookup service records, including a record 214 for lookup service 1 through a record 216 for lookup service n. As discussed below, each lookup service record contains information that can be used to discover devices of the specified device type. Further information can include records containing information for specific probes, record 218 for probe 1 through record 220 for probe n. As discussed in more detail below, the probe information can be used to create probes that can be used to discover devices of type 210.

Each lookup service record, such as record 214, contains information identifying a specific lookup service where devices of type 210 might be registered. This specific information includes a lookup service name field 230, a lookup service class field 232 and a set of property fields, of which two fields, 234 and 236, are shown. The lookup class field 232 contains the name of an object-oriented class from which a lookup object can be instantiated. This latter object contains the software code, which together with any specified properties, can be used to tailor the inventive discovery framework to search on the named directory or registry service for the specific device type.

Similarly, each probe record contains information for creating a specific probe. This information can illustrative include a type field 240, a class field 242 and a set of property fields of which two, 244 and 246, are shown. The class field 242 contains the name of an object-oriented class that can be used to instantiate an object containing software code that can be used tailor the discovery framework to discover objects of the specified type.

Illustratively, each of the files 204-208 can consist of information stored in a particular format, for example, an Extensible Markup Language (XML) format. XML is a well-known file format that allows information to be stored in a computer readable form and has been developed by an industry group called the World Wide Web Consortium. An XML document is composed of a series of entities or objects. Each entity can contain one or more logical elements and each element can have certain attributes or properties that describe the way in which it is to be processed. XML provides a formal syntax for describing the relationships between the entities, elements and attributes that make up an XML document. This syntax tells the computer how to recognize the component parts of each document.

XML uses paired markup tags to identify document components. In particular, the start and end of each logical element is clearly identified by entry of a start-tag before the element and an end-tag after the element. For example, the tags <to > and </to > could be used to identify the "recipient" element of a document in the following manner:

document text . . . <to >Recipient</to > . . . document text.

An illustrative file in XML format containing information for devices of type Switch_A noted above might consist of the following:

```
<device>
   <type>Switch_A</type>
   <category>Switch</category>
   <lookupService>
   <name>SLP</name>
   <class>Lookup_1</class>
   </lookupService>
   </lookupService>
   <name>JiniLookup</name>
   <class>Lookup_2</class>
   <properties>
      <keyvalue       key="defaultLocation"
          value="myServer"/>
      <keyvalue key="multiCastRadius" value="10"/>
   </properties>
   </lookupService>
   <probe>
   <type>SNMP</type>
   <class>Switch_A_Probe</class>
   <properties>
      <keyvalue key="sysDescr" value="SUN System A,
          SUN System B"/>
   </properties>
   </probe>
</device>
```

In the above illustration, the entries in the lookup service fields specify that both the SLP and Jini lookup services should be searched from devices of type Switch_A. The Lookup_1 and Lookup_2 classes are the two classes used to configure the discovery framework to search the SLP and Jini services, respectively. The probe class "Switch_A_Probe" is the name of an object-oriented class that can be used to instantiate a probe object that tailors the discovery framework to find devices of the Switch_A type on a network.

Figure 3:
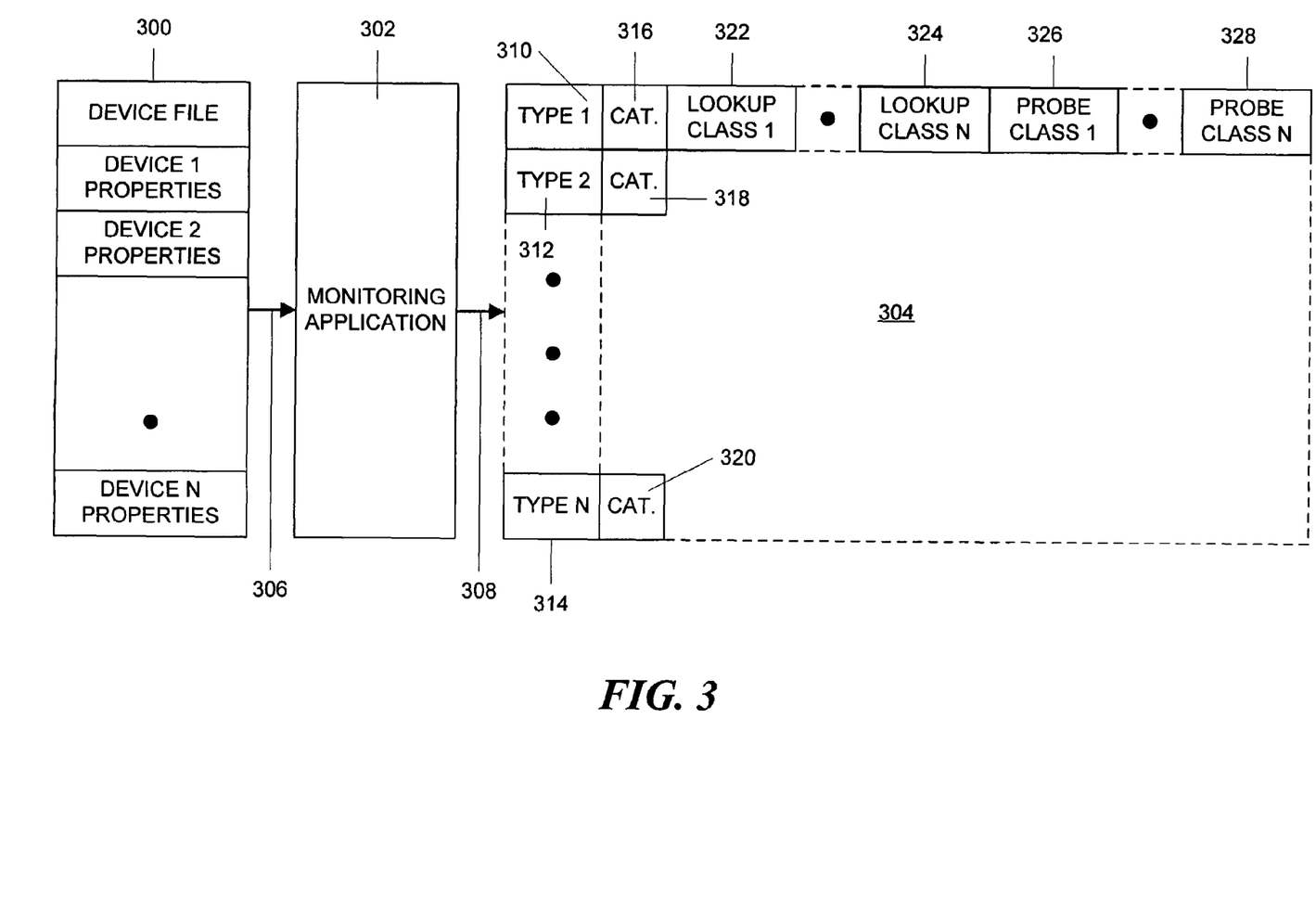
FIG. 3 is a block schematic diagram of a data structure created in memory and used by the inventive discovery framework to identify devices.

Periodically, the monitoring application 200 reads all the files (204-208) located in the device directory 202 and stores the information contained in files 204-208 in memory in a data structure indexed by device type. Such a data structure is illustrated in FIG. 3 and is used during the discovery operation. As shown in FIG. 3, the monitoring application 302 periodically reads the contents of the device file 300 as indicated schematically by arrow 304. Using the contents of the file, the monitoring application 302 constructs a data structure 304 as indicated schematically by arrow 308.

The data structure 304 includes a row representing each device type. Each row is referenced by device type keys 310-314 and includes a category field, of which fields 316-320 are shown. Each row also includes the class identifiers for each of the lookup classes associated with the device type of that row. For example, in FIG. 3, the row associated with device type 1 key has been expanded to illustrate the contents. The class identifiers for lookup class 1 (322) through lookup class n (324) are illustrated. Similarly, each row also includes the class identifiers for each of the probe classes associated with the device type of that row. For example, in FIG. 3, the class identifiers for probe class 1 (326) through probe class n (328) are illustrated.

An illustrative data structure for the device types shown above could take the form:

| Type Key | Category | Lookup Classes | Probe classes |
| --- | --- | --- | --- |
| Switch_A -> | Switch | Lookup_1, Lookup_2 | Switch_A_Probe |
| Switch_B -> | Switch | | Switch_B_Probe |
| Storage_Array_A -> | Storage Array | | Storage_Array_A_Probe |
| Storage_Array_B -> | Storage Array | | Storage_Array_B_Probe |

If a file for a new device type is added to the device file 300 while the monitoring application 302 is discovering devices, during the next scan of the device file 300, the new device type will be recognized and added to the above data structure.

The data structure is used to create discovery objects tailored for specific device types that implement predetermined standard interfaces. These discovery objects are illustrated in schematic form in FIG. 4. Such discovery objects comprise lookup discovery objects 404 and probe discovery objects 408. All lookup discovery objects 404 have a standard DeviceFinder interface 402. Similarly, all probe objects 408 have a standard Probe interface 406. The monitoring application has a device discovery framework 400 that operates with the standard interfaces 402 and 406. Although each discovery object is written for a specific device type, all objects implement one of the standard interfaces and thus can operate with a discovery framework 400 that is the same for all device types. More specifically, the discovery framework can make the same method calls on each discovery object to perform the discovery operation.

Figure 4:
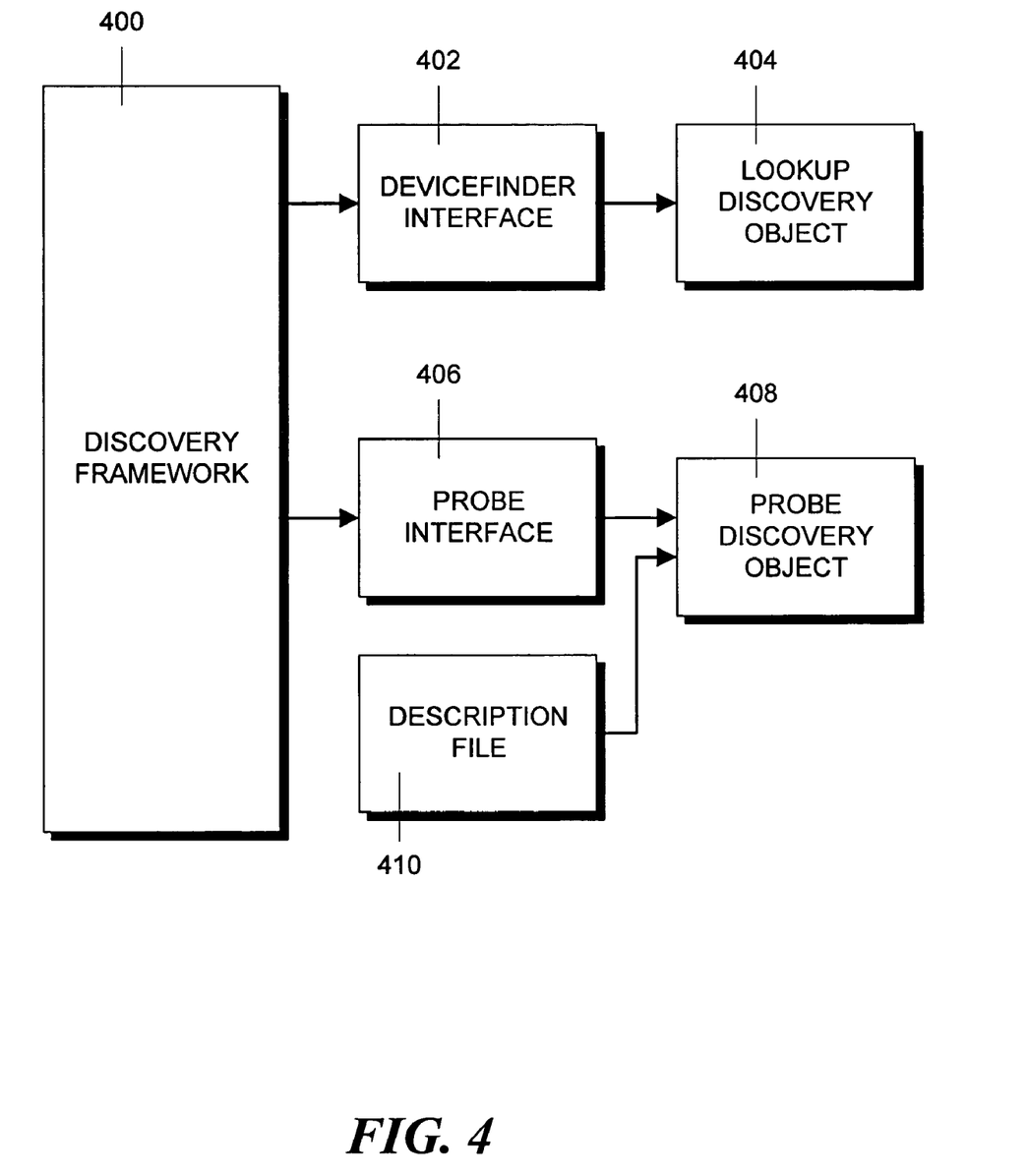
FIG. 4 is a block schematic diagram that illustrates the discovery framework and how it controls, via standard interfaces, lookup discovery objects and probe discovery objects that are tailored to discover specific device types.

In particular, during device discovery processing, the data structure shown in FIG. 3 is read for a particular device type and an instance of a lookup discovery object 404 is dynamically created for each lookup class entry. Illustratively, such an object instance can be created for each lookup entry by a call such as:

Class c=Class.forName("Lookup_1");

Lookup lookup=new Instance(c);

Each lookup class is expected to implement a DeviceFinder interface 402 with which the discovery framework 400 interacts. If the class does not implement the device finder interface, the class is recognized as an invalid lookup class. A sample device finder interface is shown below. This interface is written in the Java language, but other well-known object-oriented languages could also be used as would be known by those skilled in the art.

```
interface DeviceFinder {
   Iterator find(String name, Properties properties);
   String getDeviceFinderType( );
   String□ getDeviceFinderProperties( );
}
```

Internally, each lookup class implements mechanisms to interact with one of the various directory and registry services for which it is designed. Specifically, the class must implement the find( ) method shown in the DeviceFinder interface above. For example, a specific lookup class internal implementation to find devices in a Jini lookup service might look like:

```
class JiniDeviceFinder {
   Iterator find(String name, Properties properties) {
      ServiceRegistrar[ ] lookup = getRegistrars( );
      for (int i = 0; i < lookup.length; i++) {
         ServiceTemplate template = getTemplate(name, properties);
         ServiceMatches items = lookup[i].lookup(template,
            Integer.MAX_VALUE);
            for (int j = 0; j < items.items.length; j++) {
               list.add(items.items[j]);
            }
      }
      return list.iterator( );
   }
}
```

When the data structure shown in FIG. 3 is read for a particular device type, an instance of a probe discovery object 408 is dynamically instantiated for each probe class entry during the discovery process. Illustratively, such an object instance can be created for each probe class entry by a call such as:

Class c=Class.forName("Switch_A_Probe");

Probe probe=new Instance(c);

Each probe class is expected to implement a standard Probe interface 406. If the class does not implement this interface, it is recognized as an invalid Probe class. The probe class may also reference a description file 410 that, illustratively, can be an XML file. The XML description file includes the name of the probe class which will be dynamically loaded and may include any additional information that will be needed by the probe object 408 that is instantiated from the probe class during the discovery operation. For example, a probe based on SNMP (Simple Network Management Protocol) could include in the description file the system description of the device type such as:

sysDescr→SUN System A,SUN System B

A device which is SNMP compliant is able to store descriptive information about itself in Management Information Bases (MIBs) and return this information to a requester. Thus, for this device type the description file is not needed. A probe based on another protocol, such as Hypertext Transfer Protocol (HTTP), or based on a proprietary protocol includes this descriptive information in the description file 410, so the probe object 408 is in no way dependent on use of SNMP. An example of such a non SNMP based probe for example might be:

<Probe type="IP">
　<class>com.sun.jade.device.array.minnow2600.service.
MinnowOOBProbe</class>

</Probe>
　While an SMNP probe might be:

<Probe type="SNMP">
　<class>com.sun.jade.device.array.t3.service.
T3OOBProbe</class>
　<properties>
　　<keyvalue key="sysDescr" value="SUN T300,SUN T3B"/>
　</properties>

</Probe>
　A device can have multiple probes (some of them being SNMP based and others not SNMP based). For example:

<Probe type="SNMP">
　<class>com.sun.jade.device.array.t3.service.
T3OOBProbe</class>
　<properties>
　　<keyvalue key="sysDescr" value="SUN T300,SUN T3B"/>
　</properties>

</Probe>

<Probe type="RHBA.FCPTARGET">
　<class>com.sun.jade.device.array.t3.service.
T3IBProbe</class>
　<properties>
　　<keyvalue key="devType" value="t3"/>
　</properties>

</Probe>
　More then one probe could be added.

<Probe type="WBEM">
　<class>com.sun.netstorage.mgmt.esm.logic.discovery.
impl.WBEMClassProbe
　</class>
　<properties>
　　<keyvalue key="CIM_CLASS"
　　　value="SunStorEdge_T3StorageSystem"/>
　　<keyvalue key="CIM_NAMESPACE"
　　　value="root\\cimv27"/>
　</properties>

</Probe>
　After the probe object 408 is created, it uses a given protocol based on the probe type. A sample Probe interface 406 is shown below written in the Java language:

interface Probe {
　Iterator probe(String name, Properties properties);
　String getProbeType( );
　String[] getProbeProperties( );
}

Each specific probe class will implement the probe( ) method in the interface to discover devices of the specified type on the network. For example, a specific implementation to discover Storage arrays of type A might look like:

class A_Probe implements Probe {
　. . .
}

A probe based on the SNMP protocol might look like:

```
class Switch_A_Probe_SNMP implements Probe {
   static String probeType = "Device A";
   static String[ ] propertyNames = {"ip", other properties . . . };
   Iterator probe(String name, Properties properties) {
      ArrayList list = new ArrayList( );
      SNMP snmpProbe = new SNMP( );
      Iterator iter = snmpProbe.probe(name);
      while (iter.hasNext( )) {
         Properties p = (Properties)iter.next( );
         String sysDescr = p.getProperty("sysDescr");
         if (sysDescr = value of "Probe.snmp.sysDescr") {
            // this is the device type we were looking for
            // add the values of interest to the data structure
            // which will be returned.
         }
      }
   }
   String getProbeType( ) {
      return probeType;
   }
   String[ ] getProbeProperties( ) {
      return propertyNames;
   }
}
```

Note that all devices do not necessarily need to have a network address. For example, in a conventional storage area network such as that shown in FIG. 1, a device, such as disk array 116 with an Ethernet card 112 (and a network IP address) is able to return information about other devices, such as disk array 142, which do not have IP addresses as long as these devices are connected to device 116. For example, in FIG. 1 disk array 142 is connected to disk array 116 by the Fibre Channel connection 132.

In order to initiate a discovery operation, a user first configures the discovery framework 400 by selecting the type of devices (or all supported devices) to be discovered by means of a conventional user interface mechanism. The user also selects the network to which these devices are connected and may also enter a network address range also using by the convention user interface. The order in which registries are searched and the network is searched is defined by the order of the entries in the device file.

The discovery process performed by the discovery framework 400 during the discovery process is illustrated in FIGS. 5A-5D, which, when placed together, form a flowchart that shows the steps in the process. This process begins in step 500 and proceeds to step 502 where a determination is made whether additional discovery must be performed to locate devices of additional device types. If devices of all device types have been processed, then the process ends in step 504.

Figure 5A:
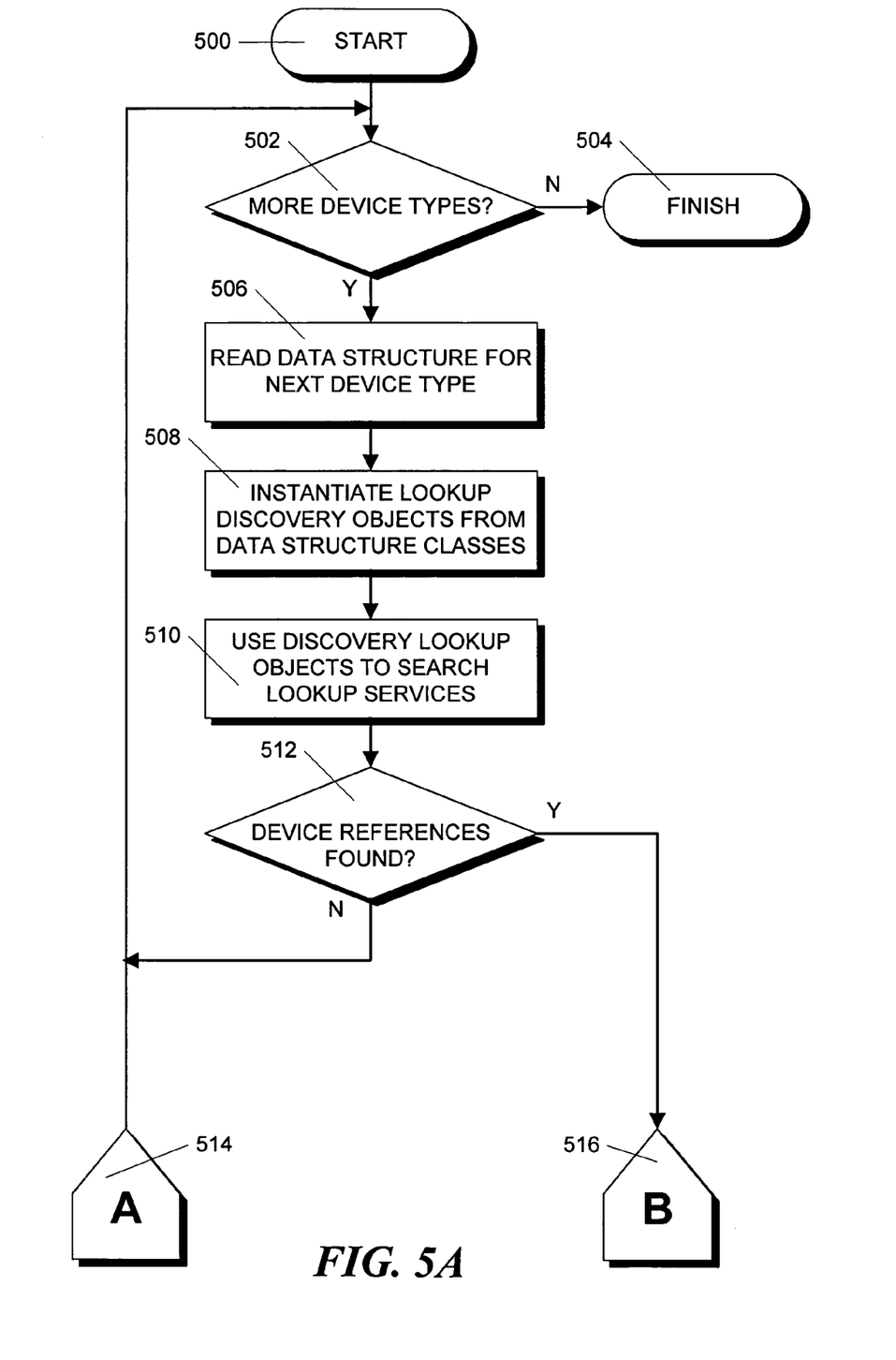
FIGS. 5A-5D, when placed together, form a flowchart showing the steps in an illustrative process for discovering devices on a network, which process is performed by the discovery framework.

Alternatively, if additional device types remain to be processed, then, in step 506, the data structure 304 (FIG. 3) is read using the device type as a key to retrieve the data structure row for either the device type chosen by the user or the next device type, if the user instructed the discovery framework to locate devices of all types.

Then, in step 508, the lookup classes 322-324 in the data row read from the data structure 304 are used to instantiate lookup discovery objects. In step 510, the lookup discovery objects are used to access their respective directory or registry services to find references for devices of the type for which the discovery process is being run.

A determination is made in step 512 whether any references have been found by the instantiated lookup discovery objects. If no references have been found, then the process returns to step 502 to determine whether additional device classes remain to be processed. When all device types have been processed, the routine ends in step 504.

Figure 5B:
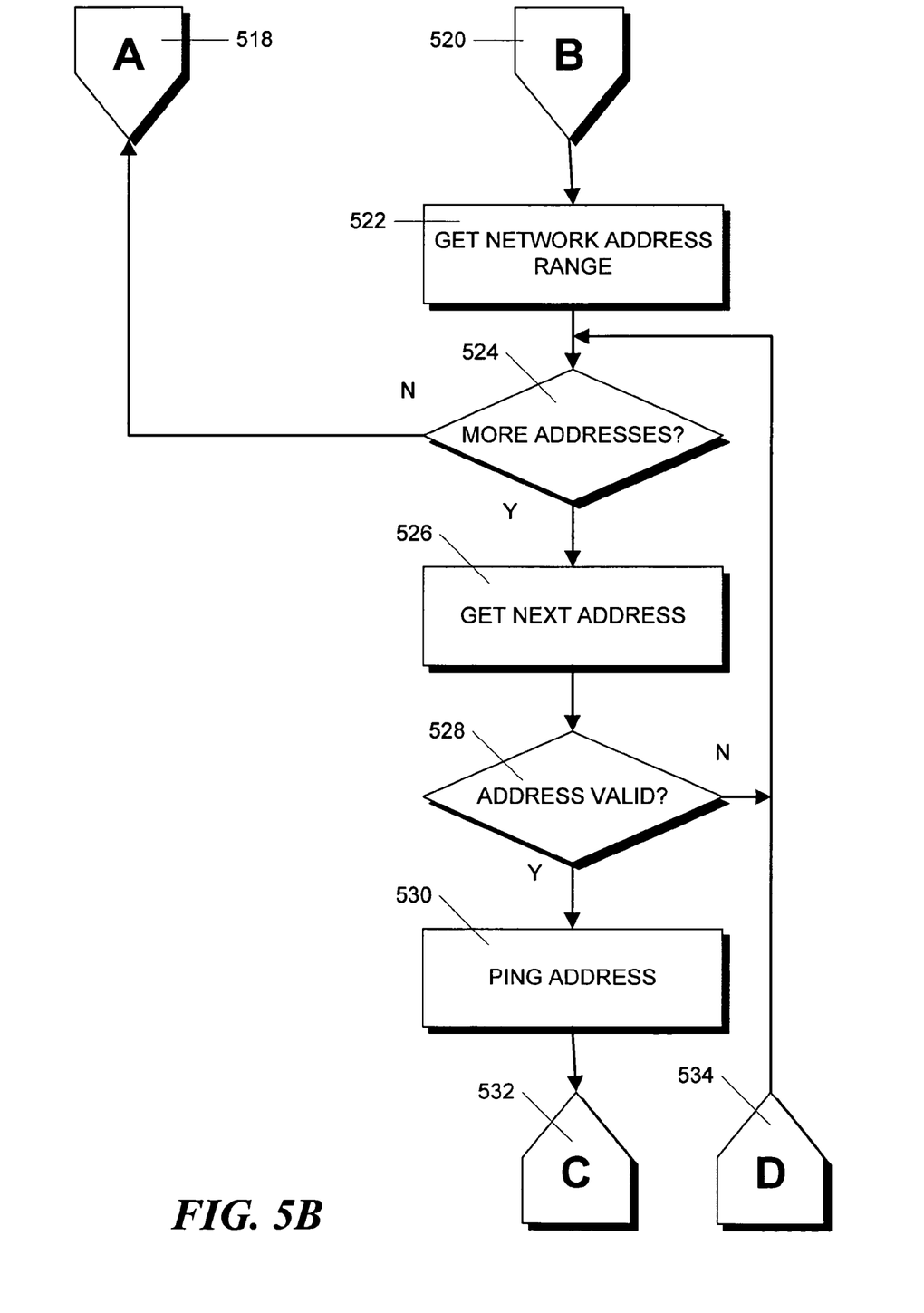

Alternatively, if, in step 512, device references are found, then the process proceeds, via off-page connectors 516 and 520, to step 522 where the network address range entered by the user is retrieved from the user interface. A check is then made in step 524 to determine whether any further addresses remain to be processed. If all addresses have been processed, then, the process proceeds, via off-page connectors 518 and 514, back to step 502 to determine whether further device types remain to be processed.

Alternatively, if, in step 524 it is determined that additional addresses remain to be processed, the process proceeds to step 526 where the next address in the range is retrieved. Then, in step 528, the retrieved address is checked for validity. If the address is not valid, the process returns to step 524 to retrieve the next address in the selected address range.

Figure 5C:
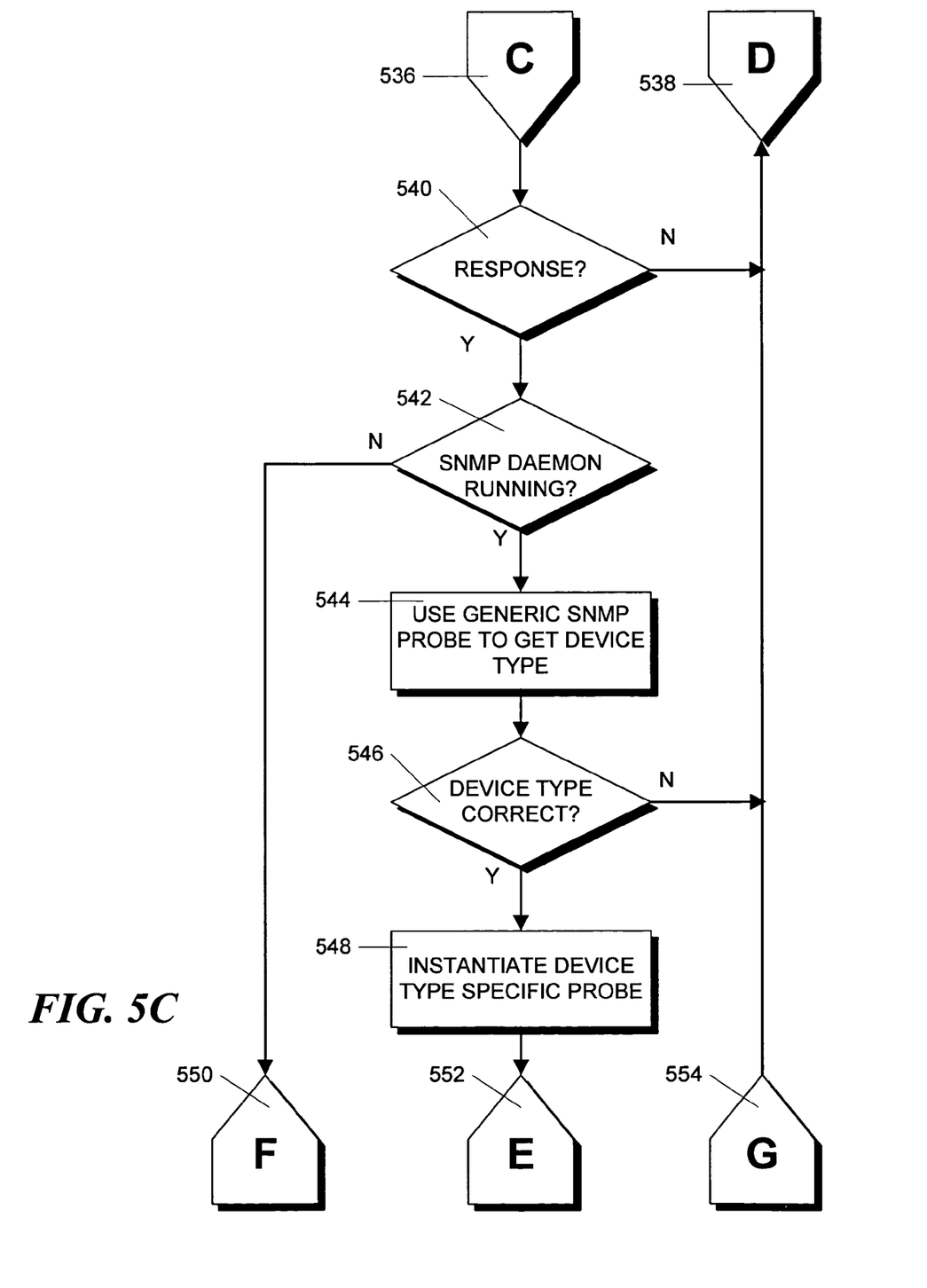

However, if, in step 528, it is determined that the address is valid, in step 530 an attempt is made to "ping" the address to check if a device is connected at that address. This "ping" operation is conducted in a well-known manner by sending a message to the address and waiting for a specific time for a response. The process then proceeds, via off-page connectors 532 and 536 to step 540 where a determination is made whether the pinged device responded. If the device did not respond, the process returns, via off-page connectors 538 and 534 to step 524 in order to process the next address.

However, if, in step 540, it is determined that a device at the selected address did respond, then, in step 542, a determination is made whether an SNMP daemon is running at the selected address. Such a daemon would indicate that the device at that address is an SNMP compatible device. If the device is SNMP compatible, then, in step 544, a generic SNMP probe is used retrieve common properties and parameters of the device. Generally, the properties and parameters will indicate the device type. For example, the properties and parameters can include a "description" field that indicates a device type. Examples of such a description field might be: description="T300" a device type that indicates a Sun storage array or description="Fibre Channel Switch."

After the device type is recovered from the information returned by the generic SNMP probe, a determination is made in step 546 whether the device is of the type desired. If not, the process returns via off-page connectors 538 and 534 back to step 524 where additional addresses are processed.

Figure 5D:
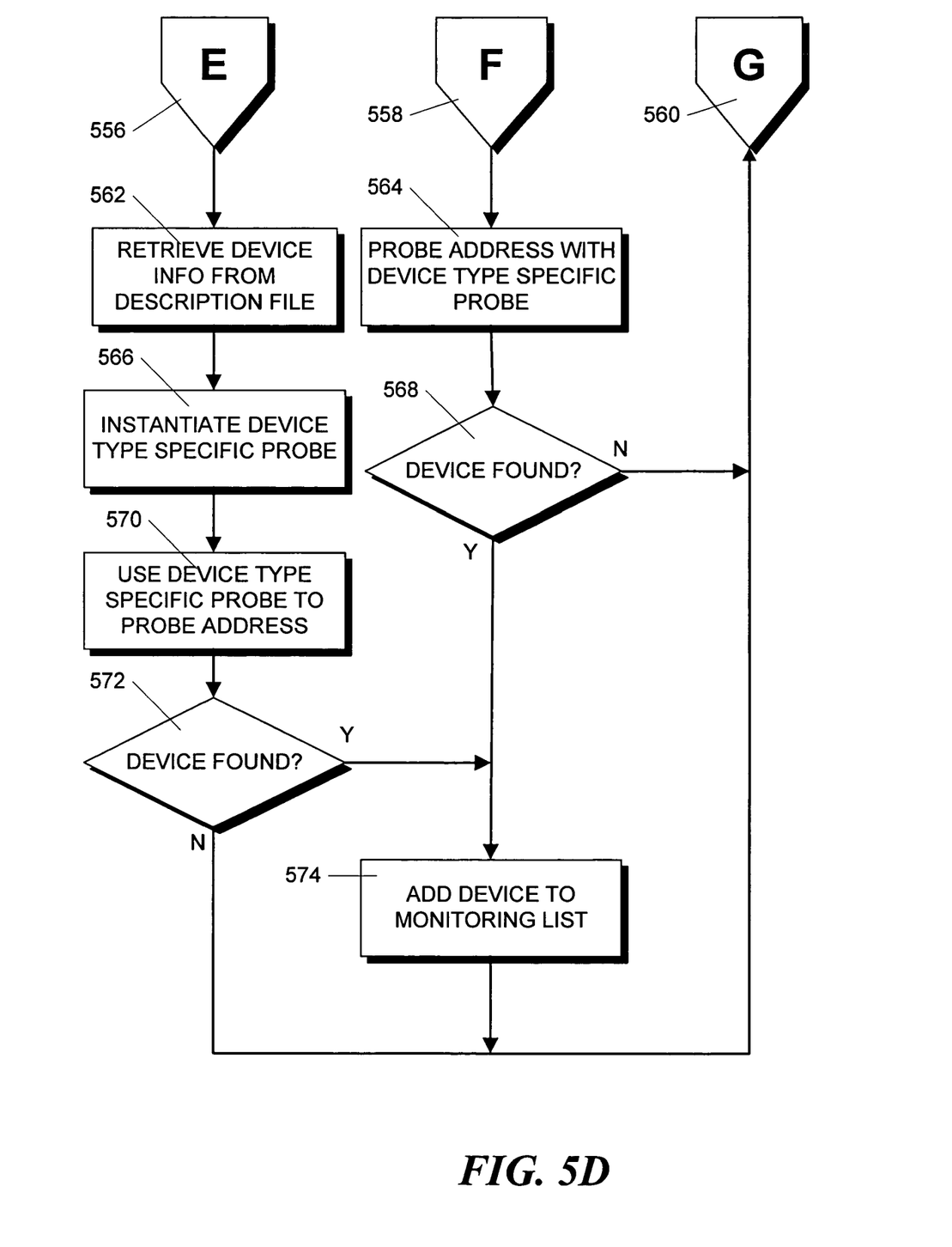

Alternatively, if it is determined in step 546 that the device type is correct, then, in step 548, a probe that is specific to the device type is instantiated from the probe classes 326-328 in the data row retrieved from the discovery data structure as previously described with reference to step 506. The process then proceeds, via off-page connectors 552 and 558 to step 564 where the device type specific probe is used to probe the selected address. The device type specific probe can be used to obtain additional parameters, such as the device World Wide Name (WWN). For example, if the generic SNMP probe returned the device type as a Fibre Channel switch, the device type specific probe might return that the device is a "Brocade" switch.

Once the additional parameters have been obtained, then, in step 568, a determination is made whether the device is of the type for which the discovery process is looking. If a device of the specified type has been found at the selected address, then the device is added to the list of monitored devices in step 574. Alternatively, if the device is not of the type for which the discovery process is looking, then the process proceeds, via off-page connectors 560 and 554 and 538 and 534, back to step 524 to check whether additional addresses remain to be processed.

If, in step 542, no SNMP daemon is detected at the selected address, then a non SNMP compliant device is located at the selected address. In this case, a probe that is specific to the device type is instantiated from the probe classes 326-328 in the data row retrieved from the discovery data structure as previously described with reference to step 506. In particular, the process proceeds, via off-page connectors 550 and 556, to step 562 where any description file associated with the device type is checked to retrieve identifying information from that file.

Using the retrieved identifying information a device type specific probe is instantiated for the desired device type in step 566 and, in step 570, the device type specific probe is used to probe the selected address.

Next, in step 572, a determination is made whether the detected device is of the type for which the discovery process is looking. This determination is made by using the identifying information retrieved from the description file associated with the probe for which a match was detected. If a device of the specified device has been found at the selected address, then the device is added to the list of monitored devices in step 574. Alternatively, if the device is not of the type for which the discovery process is looking or the device has been added to the monitoring list, then the process proceeds, via off-page connectors 560 and 554 and 538 and 534, back to step 524 to determine whether further retrieved addresses remain to be processed.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, protocols and translations different from those shown may be performed. Other aspects, such as the specific process flow and the order of the illustrated steps, as well as other modifications to the inventive concept are intended to be covered by the appended claims.

What is claimed is:

1. A method, operable in a system that monitors a network, for discovering devices of various device types, wherein, for each device type, discovery information specifying a directory lookup procedure and a network probe procedure has been provided for that device type, the method comprising:
    (a) providing a discovery framework that is controlled by the system to discover devices on the network, the discovery framework having a predetermined interface;
    (b) during a discovery operation, reading the discovery information for a specific device type; and
    using the discovery information to instantiate a plug-in module with a directory lookup procedure and a network probe procedure that are both dependent on the specific device type and with the predetermined interface that is independent of the specific device type, the module specifying the directory lookup procedure for examining network directories for device references and the network probe procedure for probing the network for referenced devices; and
    (c) controlling the module with the discovery framework to discover devices of the specified type on the network.

2. A method, operable in a system that monitors a network, for discovering devices of various device types, wherein, for each device type, discovery information specifying a directory lookup procedure and a network probe procedure has been provided for that device type, the method comprising:
    (a) providing a discovery framework that is controlled by the system to discover devices on the network, the discovery framework having a predetermined interface;
    (b) during a discovery operation, reading the discovery information for a specific device type; and
    using the discovery information to instantiate a lookup discovery module and a probe discovery module for devices of the specific type, each module with the predetermined interface, the lookup discovery module specifying a directory lookup procedure for examining network directories for device references and the probe discovery module specifying a network probe procedure for probing the network for referenced devices; and
    (c) controlling the modules with the discovery framework to discover devices of the specified type on the network.

3. A method, operable in a system that monitors a network, for discovering devices of various device types, wherein, for each device type, discovery information specifying a directory lookup procedure and a network probe procedure has been provided for that device type, the method comprising:
    (a) providing a discovery framework that is controlled by the system to discover devices on the network, the discovery framework having a predetermined interface, the predetermined interface comprising a lookup interface and a probe interface;
    (b) using the discovery information to create a plug-in module with the predetermined interface, the module specifying a directory lookup procedure for examining network directories for device references and a network probe procedure for probing the network for referenced devices; and
    (c) controlling the module with the discovery framework to discover devices of the specified type on the network by:
    (c1) controlling the module via device type independent method calls in the lookup interface to find references to devices of the specific type in the network directories using device type dependent procedures; and
    (c2) controlling the module via device type independent method calls in the probe interface to probe the network using device type dependent procedures to obtain network addresses of devices with references discovered in step (c1).

4. The method of claim 3 further comprising:
    (e) specifying a range of network addresses; and wherein step (c2) comprises probing each address in the range of addresses.

5. A method, operable in a system that monitors a network, for discovering devices of various device types, wherein, for each device type, discovery information specifying a directory lookup procedure and a network probe procedure has been provided for that device type, the method comprising:

(a) providing a discovery framework that is controlled by the system to discover devices on the network, the discovery framework having a predetermined interface;
(b) specifying a device type for devices to be discovered;
(c) using the discovery information for the specified device type to create a plug-in module with the predetermined interface, the module specifying a device type dependent directory lookup procedure for examining network directories for device references and a device type dependent network probe procedure for probing the network for referenced devices; and
(d) controlling the module with the discovery framework via device type independent method calls in the lookup interface to find references to devices of the specified type in network directories using device type dependent procedures in the module.

6. The method of claim 5 further comprising:
(e) pinging each address in a specified address range when device references are found in step (d); and
(f) when a response is received at an address from a ping, determining whether a device located at that address is SNMP compliant.

7. The method of claim 6 further comprising:
(g) for each SNMP compliant item for which information is located in step (f), controlling the module via device type independent method calls in the probe interface to probe the address using device type dependent procedures to determine whether any devices at the address match the specified device type.

8. The method of claim 7 further comprising:
(h) for each device matching the specified device type, using a device specific protocol to retrieve device information when the device is not an SNMP compliant device.

9. The method of claim 8 wherein the device specific protocol is contained within a description file referenced by the device type dependent probe procedures.

10. Apparatus, operable in a system that monitors a network, for discovering devices of various device types, wherein, for each device type, discovery information specifying a directory lookup procedure and a network probe procedure has been provided for that device type, the apparatus comprising:
a discovery framework that is controlled by the system to discover devices on the network, the discovery framework having a predetermined interface;
a module creation mechanism that is responsive to the discovery information to create a plug-in module, the module creation mechanism comprising:
a reader that, during a discovery operation, reads the discovery information for a specific device type; and
an object instantiator that uses the discovery information to instantiate the plug-in module with a directory lookup procedure and a network probe procedure that are both dependent on the specific device type and with the predetermined interface that is independent of the specific device type, the module specifying the directory lookup procedure for examining network directories for device references and the network probe procedure for probing the network for referenced devices; and
a discovery procedure in the discovery framework that controls the module to discover devices of the specified type on the network.

11. Apparatus, operable in a system that monitors a network, for discovering devices of various device types, wherein, for each device type, discovery information specifying a directory lookup procedure and a network probe procedure has been provided for that device type, the apparatus comprising:
a discovery framework that is controlled by the system to discover devices on the network, the discovery framework having a predetermined interface;
a module creation mechanism that is responsive to the discovery information, the module creation mechanism comprising:
a reader that, during a discovery operation, reads the discovery information for a specific device type; and
an object instantiator that uses the discovery information to instantiate a lookup discovery module and a probe discovery module for devices of the specific type, each module with the predetermined interface, the lookup discovery module specifying a directory lookup procedure for examining network directories for device references and the probe discovery module specifying a network probe procedure for probing the network for referenced devices; and
a discovery procedure in the discovery framework that controls the modules to discover devices of the specified type on the network.

12. Apparatus, operable in a system that monitors a network, for discovering devices of various device types, wherein, for each device type, discovery information specifying a directory lookup procedure and a network probe procedure has been provided for that device type, the apparatus comprising:
a discovery framework that is controlled by the system to discover devices on the network, the discovery framework having a predetermined interface, the predetermined interface comprising a lookup interface and a probe interface;
a module creation mechanism that is responsive to the discovery information to create a plug-in module with the predetermined interface, the module specifying a directory lookup procedure for examining network directories for device references and a network probe procedure for probing the network for referenced devices; and
a discovery procedure in the discovery framework that controls the module to discover devices of the specified type on the network, the discovery procedure comprising:
a lookup mechanism that controls the module via device type independent method calls in the lookup interface to find references to devices of the specific type in the network directories using device type dependent procedures; and
a probe mechanism that controls the module via device type independent method calls in the probe interface to probe the network using device type dependent procedures to obtain network addresses of devices with references discovered by the lookup mechanism.

13. The apparatus of claim 12 further comprising a user interface that receives information from a user specifying a range of network addresses and wherein the probe mechanism comprises a mechanism for probing each address in the range of addresses.

14. Apparatus, operable in a system that monitors a network, for discovering devices of various device types, wherein, for each device type, discovery information specifying a directory lookup procedure and a network probe procedure has been provided for that device type, the apparatus comprising:

a discovery framework that is controlled by the system to discover devices on the network, the discovery framework having a predetermined interface;

a user interface for specifying a device type for devices to be discovered;

a module creation mechanism that uses the discovery information for the specified device type to create a plug-in module with the predetermined interface, the module specifying a device type dependent directory lookup procedure for examining network directories for device references and a device type dependent network probe procedure for probing the network for referenced devices; and a discovery procedure that controls the module with the discovery framework via device type independent method calls in the lookup interface to find references to devices of the specified type in network directories using device type dependent procedures in the module.

15. The apparatus of claim 14 further comprising means for pinging each address in a specified address range when device references are found by the discovery procedure and means for determining whether a device located at an address is SNMP compliant when a response is received at the address from a ping.

16. The apparatus of claim 15 further comprising a discovery procedure operable for each SNMP compliant item for controlling the module via device type independent method calls in the probe interface to probe the address using device type dependent procedures to determine whether any devices at the address match the specified device type.

17. The apparatus of claim 16 further comprising means operable for each non SNMP compliant device for using a device specific protocol to retrieve device information.

18. The method of claim 17 wherein the device specific protocol is contained within a description file referenced by the device type dependent probe procedures.

19. Apparatus, operable in a system that monitors a network, for discovering devices of various device types, wherein, for each device type, discovery information specifying a directory lookup procedure and a network probe procedure has been provided for that device type, the apparatus comprising:

means controlled by the system for discovering devices on the network, the discovery means having a predetermined interface;

means responsive to the discovery information for creating a plug-in module with the predetermined interface, the module specifying a device type dependent directory lookup procedure for examining network directories for device references and a device type dependent network probe procedure for probing the network for referenced devices; and means for controlling the module to discover devices of the specified type on the network.

20. A computer program product, operable in a system that monitors a network, for discovering devices of various device types, wherein, for each device type, discovery information specifying a directory lookup procedure and a network probe procedure has been provided for that device type, the computer program product comprising a computer storage medium having computer readable program code thereon, including:

discovery framework program code that is controlled by the system to discover devices on the network, the discovery framework having a predetermined interface;

program code for using the discovery information to create a plug-in module, the program code for creating the plug-in module comprising program code operable during a discovery operation for reading the discovery information for a specific device type and program code that uses the discovery information to instantiate the plug-in module with a directory lookup procedure and a network probe procedure that are both dependent on the specific device type and with the predetermined interface that is independent of the specific device type, the module specifying the directory lookup procedure for examining network directories for device references and the network probe procedure for probing the network for referenced devices; and program code in the discovery framework for controlling the plug-in module to discover devices of the specified type on the network.

21. A computer program product, operable in a system that monitors a network, for discovering devices of various device types, wherein, for each device type, discovery information specifying a directory lookup procedure and a network probe procedure has been provided for that device type, the computer program product comprising a computer storage medium having computer readable program code thereon, including:

discovery framework program code that is controlled by the system to discover devices on the network, the discovery framework having a predetermined interface;

program code for using the discovery information to create a plug-in module, the program code for creating the plug-in module comprising program code operable during a discovery operation for reading the discovery information for a specific device type and program code that uses the discovery information to instantiate a lookup discovery module and a probe discovery module for devices of the specific type, each module with the predetermined interface, the lookup discovery module specifying a directory lookup procedure for examining network directories for device references and the probe discovery module specifying a network probe procedure for probing the network for referenced devices; and program code in the discovery framework for controlling the plug-in module to discover devices of the specified type on the network.

* * * * *